(No Model.)
G. H. LASAR.
BAND CUTTER AND FEEDER.
No. 440,865. Patented Nov. 18, 1890.
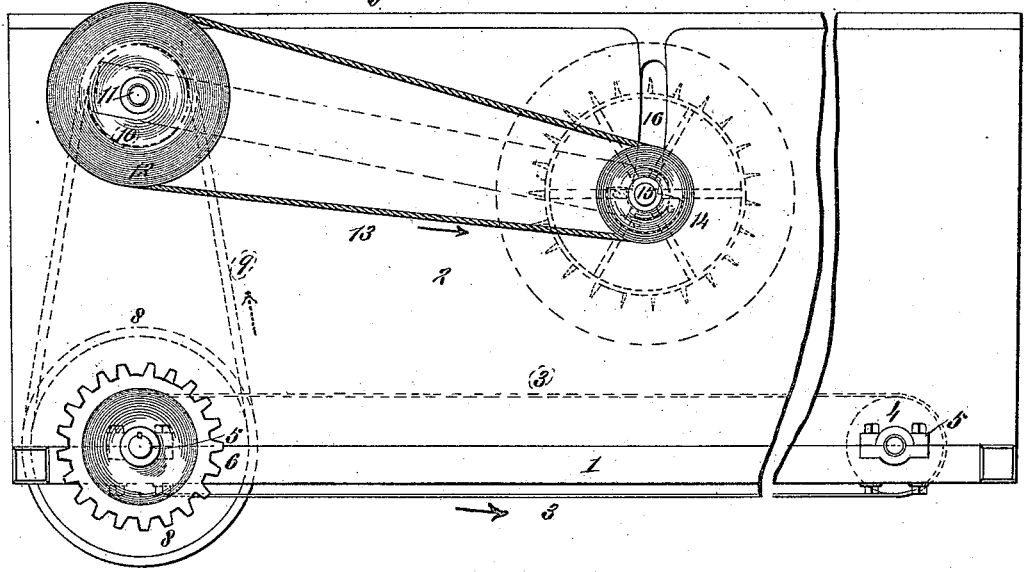
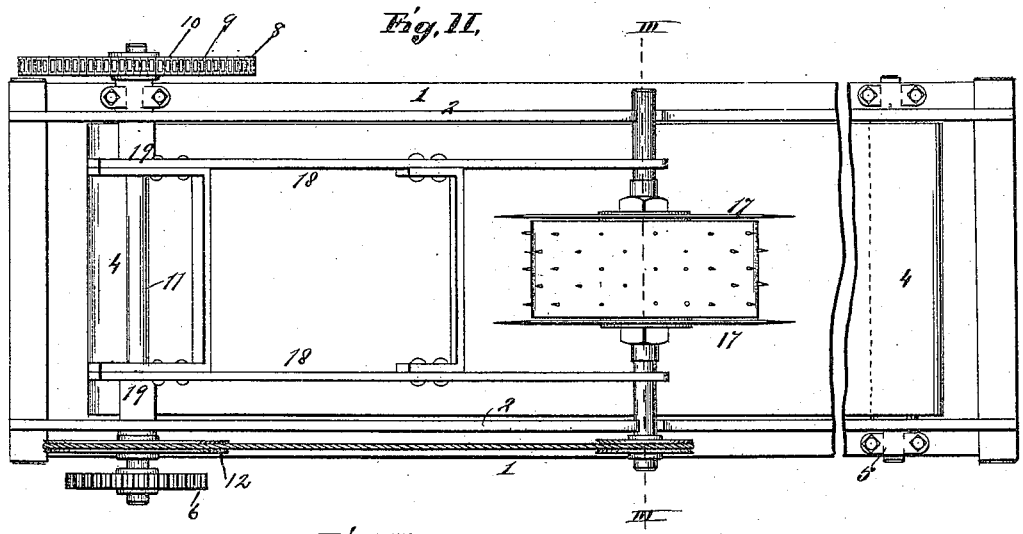
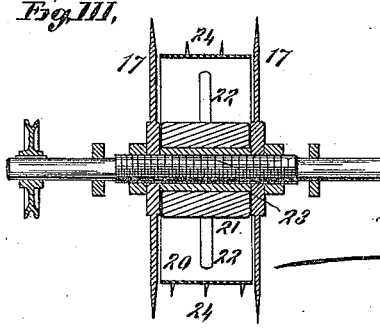
Attest:
E. Arthur
Geo. E. Cruse
Inventor:
Godfrey H. Lasar
By Knight Bros.
Attys.

UNITED STATES PATENT OFFICE.

GODFREY H. LASAR, OF ST. LOUIS, MISSOURI.

BAND-CUTTER AND FEEDER.

SPECIFICATION forming part of Letters Patent No. 440,865, dated November 18, 1890.

Application filed July 8, 1889. Serial No. 316,829. (No model.)

*To all whom it may concern:*

Be it known that I, GODFREY H. LASAR, of the city of St. Louis, in the State of Missouri, have invented a certain new and useful Improvement in a Band-Cutter and Feeder, of which the following is a full, clear, and exact description, reference being had to the accompanying drawings, forming part of this specification, and in which—

Figure I is a detail side elevation illustrative of my invention. Fig. II is a top or plan view. Fig. III is a transverse section taken on line III III, Fig. II.

This invention relates to certain improvements in band-cutters and feeders for thrashing-machines; and it consists in features of novelty hereinafter fully described, and pointed out in the claims.

Referring to the drawings, 1 represents a frame, which in practice would be located near the mouth or feed-opening of a thrashing-machine, so as to deliver the material to the cylinder of the machine. On the frame 1 are vertical side pieces 2. At the bottom of the box thus formed is an endless apron or belt 3, which passes around drums or rollers 4, journaled to the frame 1 by means of boxes 5. On one of the journals of one of the drums is a gear-wheel 6, which receives the power from any suitable motor and transmits it to the drums for the purpose of operating the belt. The motor may, and in most cases preferably would, consist of the thrashing-machine itself. On another spindle of one of the drums is secured a pulley 8, which is connected by means of a belt 9 to a pulley 10 on a shaft 11, journaled in the upper ends of the side pieces 2, as shown by dotted lines in Fig. I, or the sprocket-wheels and chain may be used, as shown in Fig. II. On the shaft 11 is another pulley 12, which is connected by means of a belt 13 to a pulley 14 on a shaft 15, which passes through a slot 16, formed in the sides 2. On the shaft 16 are secured cutting disks or knives 17, as shown in Figs. II and III. The disks are firmly secured to the shaft, so as to be turned by the shaft through means of the connecting-belts and pulleys described. Shaft 15 is held in place in the slot by means of arms 18, forming a frame, through the lower end of which the shaft 15 passes, the frame having pivotal connection at 19 with the shaft 11. The disks 17 are, as will be plainly seen, located over the apron 3, and as the sheaves are carried by the apron under these disks the bands are cut by the disks.

For the purpose of providing an automatic adjustment of the disks or cutters to sheaves of different sizes, I arrange the disks so that they will rise and fall and thus adjust themselves. This attachment is effected by the supporting-shaft 15 fitting in the slots 16 and the supporting-frame 18 rising and falling with the disks. For the purpose of preventing the disks cutting too far into the sheaves or farther than is necessary, I locate between them a cylinder 20. (See Figs. II and III.) The hub 21 of the cylinder (to which the rim is connected by spokes 22) fits loosely on the shaft 15, a bushing 23 being preferably placed between them. On the periphery of the cylinder are a number of points or prongs 24. As the sheaves are carried beneath the cutters by the traveling belt 3, the cylinder bearing on the sheaves will more readily cause the disks to rise under the pressure and prevent their cutting into the sheaves farther than is necessary to sever the bands. By providing the cylinder with the prongs 24 the cylinder will be made to turn under the movement of the sheaves, and will not be so liable to interfere with the passage of the sheaves as it would were it not to revolve readily under the pressure of the sheaves.

I claim as my invention—

1. In a band-cutter, a combination of a carrying-belt, a shaft, rotary cutters secured to the shaft, a drum loosely mounted on the shaft and provided with radial pins, and means for turning the shaft, substantially as set forth.

2. In a band-cutter, a combination of a carrying-belt, a vertically-movable shaft, cutters secured to the shaft, a drum loosely mounted on the shaft between the cutters, a frame 18, and mechanism for driving the shaft, substantially as set forth.

GODFREY H. LASAR.

In presence of—
EDW. S. KNIGHT,
THOMAS KNIGHT.